(12) United States Patent
Nakane

(10) Patent No.: US 10,359,974 B2
(45) Date of Patent: Jul. 23, 2019

(54) PRINTING APPARATUS, METHOD FOR ESTIMATING A TIME REQUIRED FOR A RENDERING PROCESS, AND STORAGE MEDIUM

(71) Applicant: CANON KABUSHIKI KAISHA, Tokyo (JP)

(72) Inventor: Hiroyuki Nakane, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/410,303

(22) Filed: Jan. 19, 2017

(65) Prior Publication Data
US 2017/0220302 A1  Aug. 3, 2017

(30) Foreign Application Priority Data
Feb. 2, 2016 (JP) .................................. 2016-018201

(51) Int. Cl.
 *G06F 3/12* (2006.01)
 *G06K 15/02* (2006.01)
(52) U.S. Cl.
 CPC .......... *G06F 3/1215* (2013.01); *G06F 3/1205* (2013.01); *G06F 3/1213* (2013.01); *G06F 3/1244* (2013.01); *G06F 3/1248* (2013.01); *G06F 3/1285* (2013.01); *G06K 15/18* (2013.01)

(58) Field of Classification Search
None
See application file for complete search history.

(56) References Cited

U.S. PATENT DOCUMENTS

| 8,947,717 B2 | 2/2015 | Nakane | |
| 2002/0054333 A1* | 5/2002 | Yamamoto | G06F 3/1205 358/1.15 |
| 2007/0195353 A1* | 8/2007 | Tsunoda | G06K 15/02 358/1.13 |

FOREIGN PATENT DOCUMENTS

| JP | H10-240459 | 9/1998 |
| JP | 2013-42458 | 2/2013 |

* cited by examiner

*Primary Examiner* — Lennin R Rodriguezgonzalez
(74) *Attorney, Agent, or Firm* — Venable LLP

(57) ABSTRACT

The printing apparatus of the present invention includes: a memory storing a program; at least one processor configured to execute the program and function as: an interpretation unit configured to interpret print data of the page to obtain objects contained in the page; an optimization prediction unit configured to check each of the obtained objects to identify the at least one object to be subject to the predetermined conversion process, and to predict, in accordance with the identified object, characteristics of the new objects which are to be obtained by the predetermined conversion process without performing the predetermined conversion process; and an estimation unit configured to estimate a time required for the rendering process of the page, based on at least parameter values corresponding to the predicted characteristics.

15 Claims, 15 Drawing Sheets

SELECT JOB

[INDIVIDUAL ▼]   [WAIT FOR PRINT]   [ALREADY PRINTED]

| ✓ | JOB NAME / PRINT SETTING | DATE AND TIME ▼ | NUMBER OF SHEETS | × | NUMBER OF COPIES | PREDICTED TIME / USER NAME |
|---|---|---|---|---|---|---|
| ☑ 2 | A4   document 1 | 09/30 04:20:57 | 55 | × | ×1 | 2 MIN USER 1 |
| ☑ 1 | POSTCARD   document 2 | 09/30 04:18:16 | 55 | × | ×1 | 4 MIN USER 2 |

1401

NUMBER OF SELECTIONS : 2
TOTAL : 2

[PRINT SETTING ▲]   [DELETE JOB ▲]   [START PRINT]

FIG.14

|  | OBJECT 302 | | OBJECT 901 | | OBJECT 1001 | |
| --- | --- | --- | --- | --- | --- | --- |
|  | BEFORE COMBINATION | ESTIMATED VALUE AFTER COMBINATION | BEFORE COMBINATION | ESTIMATED VALUE AFTER COMBINATION | BEFORE COMBINATION | ESTIMATED VALUE AFTER COMBINATION |
| NUMBER OF PIXELS | 125 | 89 | 50 | 84 | 70 | 75 |
| NUMBER OF SEGMENTS | 10 | 18 | 4 | 2 | 2 | 28 |
| NUMBER OF SPANS | 25 | 13 | 10 | 7 | 10 | 10 |

FIG.15

PRINTING APPARATUS, METHOD FOR ESTIMATING A TIME REQUIRED FOR A RENDERING PROCESS, AND STORAGE MEDIUM

BACKGROUND OF THE INVENTION

Field of the Invention

The present invention relates to a printing apparatus that predicts a printing time necessary for printing of print data, a method for estimating a time required for a rendering process, and a storage medium.

Description of the Related Art

Conventionally, there is known an image forming apparatus that generates intermediate data by interpreting a PDL (Page Description Language) drawing command and generates bitmap image data based on the generated intermediate data.

The image forming apparatus of Japanese Patent Laid-Open No. H10-240459 (1998) includes a function to predict a printing time in the case where rendering processing is performed actually by analyzing PDL data. The image forming apparatus of Japanese Patent Laid-Open No. H10-240459 (1998) obtains an object, which is a drawing element, such as a color, image, graphics, and character, by interpreting a PDL drawing command. Then, the image forming apparatus calculates a printing prediction time of the PDL data by totaling the time necessary for processing of the object.

Further, the image forming apparatus of Japanese Patent Laid-Open No. 2013-042458 includes a function to reduce the time necessary for rendering processing by integrating (combining) a plurality of objects into a smaller number of objects. The image forming apparatus of Japanese Patent Laid-Open No. 2013-042458 suppresses the number of processing-target edges and the number of processing-target levels by, for example, combining a small object group arranged within a predetermined area. Due to the configuration such as this, the processing load is alleviated, and therefore, it is possible for the image forming apparatus of Japanese Patent Laid-Open No. 2013-042458 to reduce the time necessary for rendering processing. The processing to integrate a plurality of objects is an example of optimization of an object.

SUMMARY OF THE INVENTION

The printing apparatus of the present invention includes: a memory storing a program; at least one processor configured to execute the program and function as: an interpretation unit configured to interpret print data of the page to obtain objects contained in the page; an optimization prediction unit configured to check each of the obtained objects to identify the at least one object to be subject to the predetermined conversion process, and to predict, in accordance with the identified object, characteristics of the new objects which are to be obtained by the predetermined conversion process without performing the predetermined conversion process; and an estimation unit configured to estimate a time required for the rendering process of the page, based on at least parameter values corresponding to the predicted characteristics.

Further features of the present invention will become apparent from the following description of exemplary embodiments (with reference to the attached drawings).

BRIEF DESCRIPTION OF THE DRAWINGS

FIG. 14 is a screen display example in the embodiment; and

FIG. 15 is a table showing estimated values of the number of pixels, the number of segments, and the number of spans acquired from the object after the combination.

DESCRIPTION OF THE EMBODIMENTS

The printing time prediction method of Japanese Patent Laid-Open No. H10-240459 (1998) did not take into consideration object optimization and it was not possible to predict a printing time of print data with a high accuracy.

In the following, embodiments for embodying the present invention are explained with reference to the drawings. However, the components described in these embodiments are merely exemplary and are not intended to limit the scope of the present invention to those.

Figure 1:
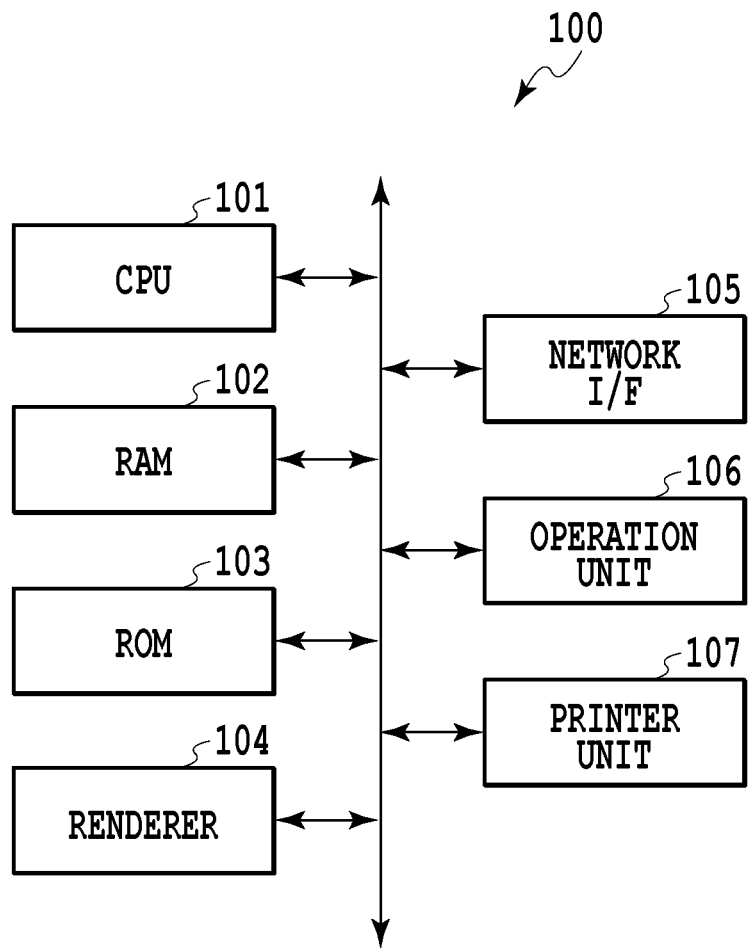
FIG. 1 is a diagram showing a hardware configuration of a printing time prediction apparatus in an embodiment.

FIG. 1 is a block diagram showing a hardware configuration example of a printing time prediction apparatus 100 in the present embodiment. It is possible to implement the printing time prediction apparatus 100 of the present embodiment by, for example, an image forming apparatus including a printer unit 107. A CPU (Central Processing Unit) 101 is a control center unit of the printing time prediction apparatus 100 and implements processing by each function block (FIG. 2) of the printing time prediction apparatus 100, to be described later. A RAM (Random Access Memory) 102 is a storage device that can be accessed by the CPU 101. The RAM 102 is made use of as a destination to secure a memory necessary to implement the processing by each function block. In a ROM (Read Only Memory) 103, programs for implementing the processing by each function block are stored and the programs are read and executed by the CPU 101.

A renderer 104 is a hardware renderer that generates bitmap image data from intermediate data, to be described later, by using, for example, a scan line method. A network interface 105 (hereinafter, interface is described as "I/F") is connected with an external device (personal computer or the like) via a network and is an interface unit for mainly performing reception of print data. In the following, explanation is given on the assumption that the print data is PDL data including a PDL (Page Description Language) drawing command. In the present embodiment, processing is explained in which the printing time prediction apparatus 100 receives PDL data from an external device, such as a PC, via a network and predicts a time necessary for printing from the PDL data. In another embodiment, the processing may be processing in which the printing time prediction apparatus 100 reads PDL data held in the RAM 102 and predicts a printing time. An operation unit 106 includes, for example, an input device, such as a touch panel, and can accept an input (instructions) by the operation of a user. The operation unit 106 is used to mainly accept an input of a setting of the printing time prediction apparatus 100 and also functions as a display unit configured to present a printing prediction time of input PDL data to a user. In this case, it can be said that the CPU 101 that causes the operation unit 106 to display the PDL data (print job) whose input has been accepted and the printing prediction time in association with each other is a display control unit of the printing time prediction apparatus. The printer unit 107 prints bitmap image data generated from PDL data on a printing medium, such as a sheet. In the present embodiment, the series of processing to generate bitmap image data from PDL data corresponds to rendering processing. Further, the "printing time" corresponds to the time necessary for rendering processing, but the "printing time" may include a time necessary for the printer unit 107 to perform printing on a printing medium.

Figure 2:
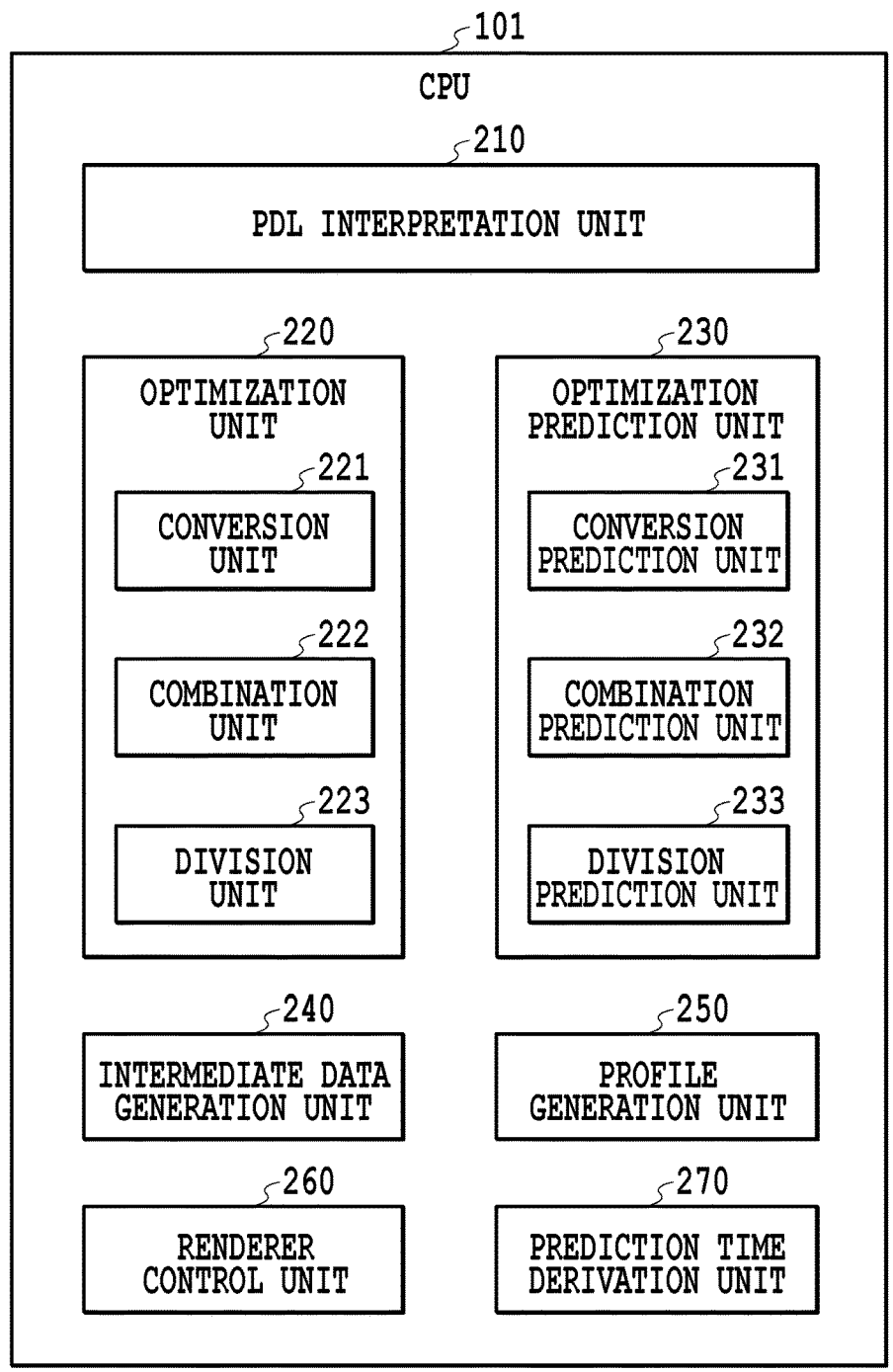
FIG. 2 is a block diagram showing a software function configuration of the printing time prediction apparatus in the embodiment.

FIG. 2 is a diagram showing an example of a software function configuration of the printing time prediction apparatus 100. All of the software function blocks of the printing time prediction apparatus 100 shown in FIG. 2 operate on the CPU 101.

A PDL interpretation unit 210 reads a PDL drawing command included in PDL data received via the network I/F unit 105 and interprets the PDL drawing command. By the PDL interpretation unit 210 interpreting the PDL drawing command, the shape and the drawing position of the drawing component, such as a color, image, graphics, and character, are determined. The drawing component such as this is called a drawing object (hereinafter, described simply as "object"). That is, the PDL interpretation unit 210 generates an object by interpreting a PDL drawing command.

An optimization unit 220 performs processing to convert an object generated by the PDL interpretation unit 210 into an object of another representation in the stage before the renderer 104 generates bitmap image data in order to reduce the processing load of the renderer 104. This processing is also called processing to optimize an object. The printing time prediction apparatus 100 of the present embodiment has a conversion unit 221, a combination unit 222, and a division unit 223 all configured to perform optimization of an object in accordance with the kind of object, but the method of optimizing an object may be one other than that described above.

Figure 3A:
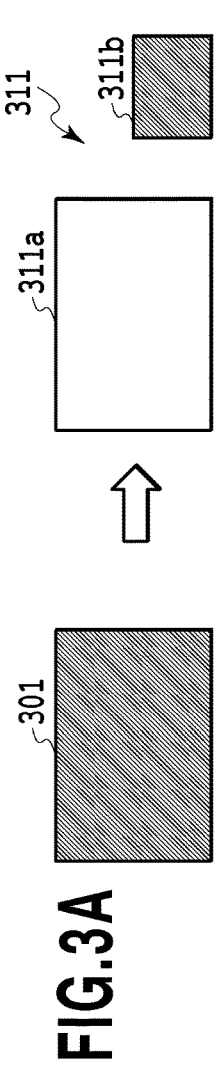
FIG. 3A to FIG. 3C are each a schematic diagram showing an example of object optimization in the embodiment.
Figure 3B:
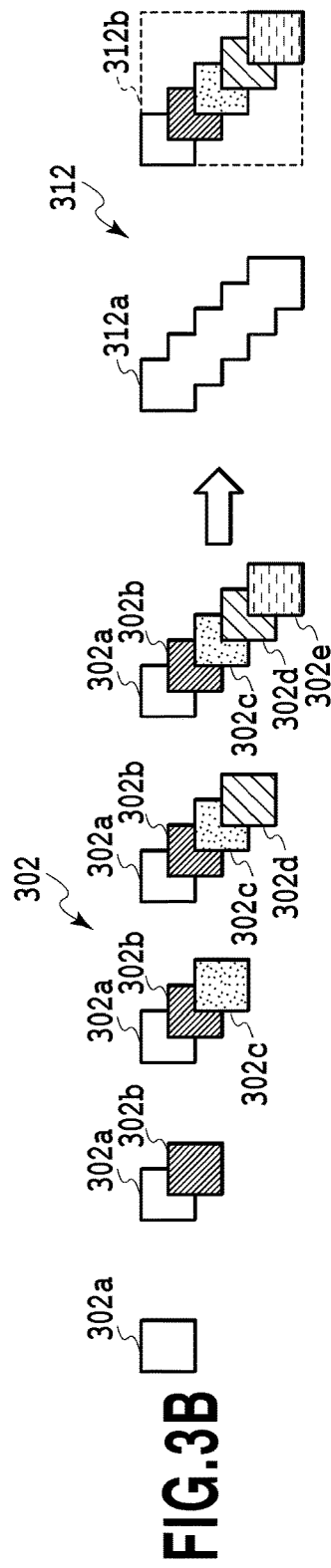
Figure 3C:
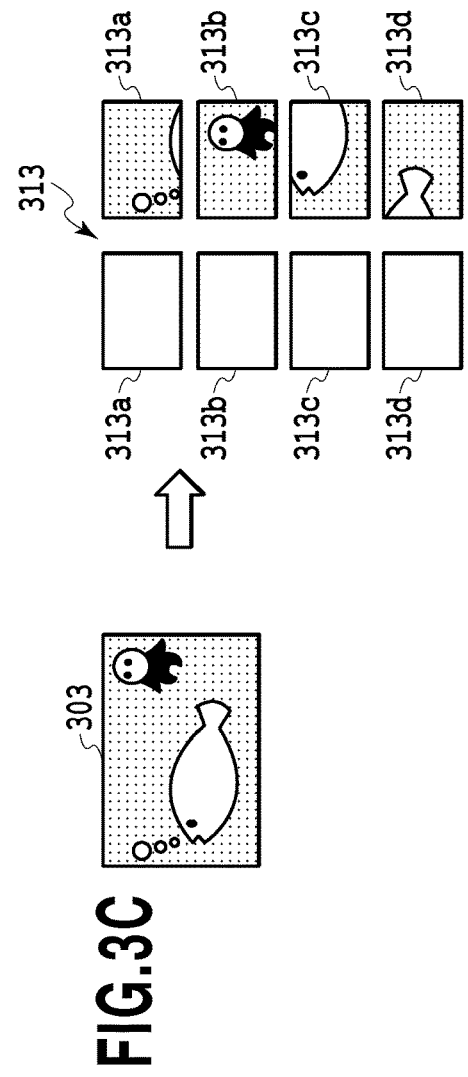

FIG. 3A to FIG. 3C are each a schematic diagram showing an example of processing to optimize an object by the optimization unit 220. In each of FIG. 3A to FIG. 3C, an example of a correspondence between an object to be optimized and an object having been optimized is shown.

FIG. 3A shows an example in which the conversion unit 221 has performed conversion of an object for an image object 301 of a single color bitmap image. It is possible for the conversion unit 221 to convert the single color image object 301 into an object 311 having a path 311a and a color value 311b. Here, the path of an object refers to a point series indicating an entire outline of the object or a segment that connects the point series. The object 311 indicates that the inside of an area represented by the path 311a is filled with a color represented by the color value 311b. By the conversion of an object shown in FIG. 3A, duplication processing of an image is omitted and it is possible to reduce the time necessary for rendering processing.

FIG. 3B shows an example in which the combination unit 222 has performed combination of an object for a plurality of square objects 302. As shown in FIG. 3B, the plurality of square objects 302 is a group of objects generated continuously in order and there occurs an overlap of the plurality of square objects 302. It is possible for the combination unit 222 to combine the plurality of square objects 302 into a single object 312 having a path 312a and a bitmap image 312b. The object 312 indicates that part of the bitmap image 312b corresponding to the area represented by the path 312a is extracted. As shown in FIG. 3B, by the plurality of square objects 302 being integrated, the number of processing-target edges or the like is reduced. Because of this, it is possible to reduce the time necessary for rendering processing. Here, the edge refers to vector information acquired by tracing the point series of an object.

FIG. 3C shows an example in which the division unit 223 has performed object division for an image object 303 of a bitmap image. It is possible for the division unit 223 to divide the single image object 303 into a plurality of objects 313 each including a path and a bitmap image. As shown in FIG. 3C, by dividing an image object of a bitmap image having a large data amount into a plurality of bitmap image objects having a small data amount, it is possible for a renderer control unit 260 to generate bitmap image data by a small memory capacity. For example, in the case where a division threshold value is 1 MB, an image object having a data capacity of 10 MB is divided into ten objects each having a data capacity of 1 MB.

An intermediate data generation unit 240 generates intermediate data suitable for processing by the renderer 104 from the object generated by the PDL interpretation unit 210. This intermediate data is generally called a display list (hereinafter, also described as "DL"). The renderer control unit 260 controls the series of processing from the processing to input the intermediate data generated by the intermediate data generation unit 240 to the renderer 104 up to the processing to output the bitmap image data to the RAM 102.

The intermediate data that is input to the renderer 104 also includes the intermediate data of the object for which optimization (conversion) has been performed by the previously described optimization unit 220. That is, the PDL interpretation unit 210, the optimization unit 220, and the intermediate data generation unit 240 generate intermediate data, in which a plurality of objects included in the PDL data is combined into one object, in order to reduce the processing load of the renderer 104 as an example of the processing. Alternatively, the PDL interpretation unit 210, the optimization unit 220, and the intermediate data generation unit 240 generate intermediate data, in which one object included in the PDL data is divided into a plurality of objects, in order to reduce the processing load of the renderer 104 as an example of the processing. That is, the PDL interpretation unit 210, the optimization unit 220, and the intermediate data generation unit 240 generate intermediate data in which the number of objects included in the PDL data is changed. Then, the renderer 104 performs processing to generate bitmap image data from the intermediate data of the object after the combination or the division. As explained above, in the present embodiment, the optimization unit 220, the intermediate data generation unit 240, and the renderer control unit 260 perform the series of processing (printing sequence) to actually print PDL data.

An optimization prediction unit 230 predicts a change that is made to the object by the optimization in the case where the object generated by the PDL interpretation unit 210 is converted (optimized) into an object of another representation by the optimization unit 220. The optimization prediction unit 230 of the present embodiment has a conversion prediction unit 231, a combination prediction unit 232, and a division prediction unit 233 corresponding to the conversion unit 221, the combination unit 222, and the division unit 223, respectively, which actually perform optimization of an object in the printing sequence. It may also be possible for the optimization prediction unit 230 to have a function block that takes into consideration an optimization method other than that described above.

The conversion prediction unit 231 predicts a change that is made to the object by the conversion in the case where the object generated by the PDL interpretation unit 210 is optimized in the rendering processing.

The combination prediction unit 232 predicts a change that is made to the object by the combination in the case where the object generated by the PDL interpretation unit 210 is optimized in the rendering processing.

The division prediction unit 233 predicts a change that is made to the object by the division in the case where the object generated by the PDL interpretation unit 210 is optimized in the rendering processing.

A profile generation unit 250 generates a profile in which a parameter value estimated by the optimization prediction unit 230 is associated with each object type. In the present embodiment, the profile generation unit 250 saves the generated profile in a storage area, such as the RAM 102.

A prediction time derivation unit 270 refers to the profile generated by the profile generation unit 250 and derives a printing prediction time of PDL data based on the parameter value included in the profile. As explained above, in the present embodiment, the optimization prediction unit 230, the profile generation unit 250, and the prediction time derivation unit 270 perform the series of processing (printing time prediction sequence) to predict a printing time necessary for printing of PDL data.

Figure 4:
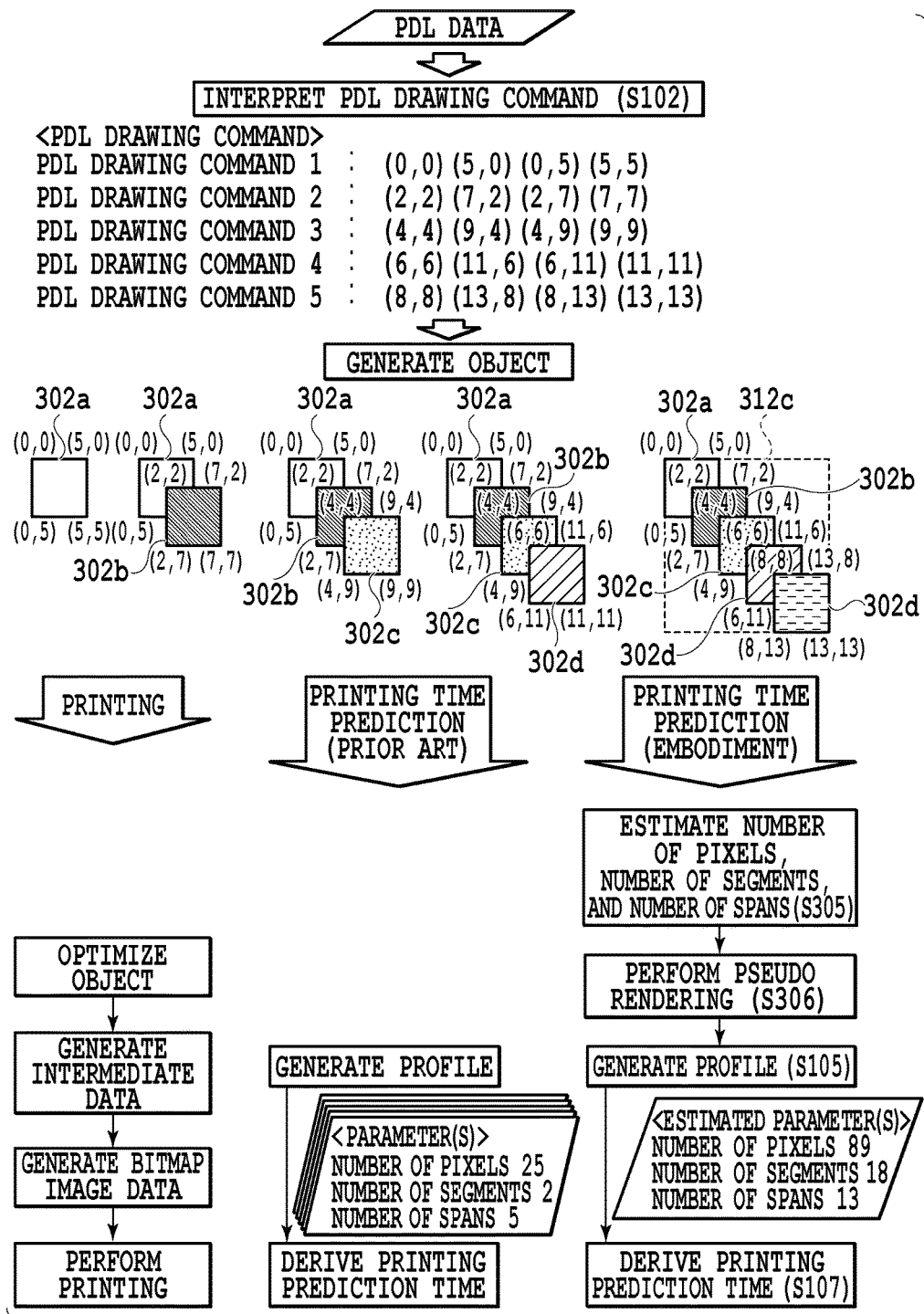
FIG. 4 is an outline diagram showing a processing procedure in the embodiment.

FIG. 4 is an outline diagram showing a procedure example of a printing sequence from PDL interpretation up to printing and a procedure example of a printing time prediction sequence from PDL interpretation up to printing prediction time derivation in the present embodiment. In the following, with reference to FIG. 4, the procedure of the printing sequence and the procedure of the printing time prediction sequence in the present embodiment are explained by comparing both the procedures. In this example, the case is explained as an example where PDL data including a PDL drawing command to command drawing of the object 302 (FIG. 3B) is input to the printing time prediction apparatus 100.

The PDL interpretation unit 210 interprets the PDL drawing command included in the PDL data and generates the object 302. Normally, in the PDL drawing command, the outline of an object is described by a point series indicating the coordinate positions in the xy-coordinate system with the top-left point as (0, 0). Description examples of the PDL drawing command and the drawing images of the object 302 of the present embodiment are shown in FIG. 4.

Object 302a: (0, 0) (5, 0) (0, 5) (5, 5)
Object 302b: (2, 2) (7, 2) (2, 7) (7, 7)
Object 302c: (4, 4) (9, 4) (4, 9) (9, 9)
Object 302d: (6, 6) (11, 6) (6, 11) (11, 11)
Object 302e: (8, 8) (13, 8) (8, 13) (13, 13)

In the printing sequence, by the method explained in FIG. 3A, the combination unit 222 combines the object 302. The intermediate data generation unit 240 generates intermediate data suitable for the processing by the renderer 104 from the combined object. Next, the renderer control unit 260 inputs the generated intermediate data to the renderer 104 and controls the series of processing until bitmap image data is output to the RAM 102. As the results of combining the object 302, the processing load of the generation of the intermediate data and the bitmap image data is alleviated. Accompanying this, it is also possible to reduce the time necessary to generate the intermediate data and the bitmap image data. After this, the bitmap image data is sent to the printer unit 107 and an image is printed on a printing medium, such as a sheet.

Figure 5:
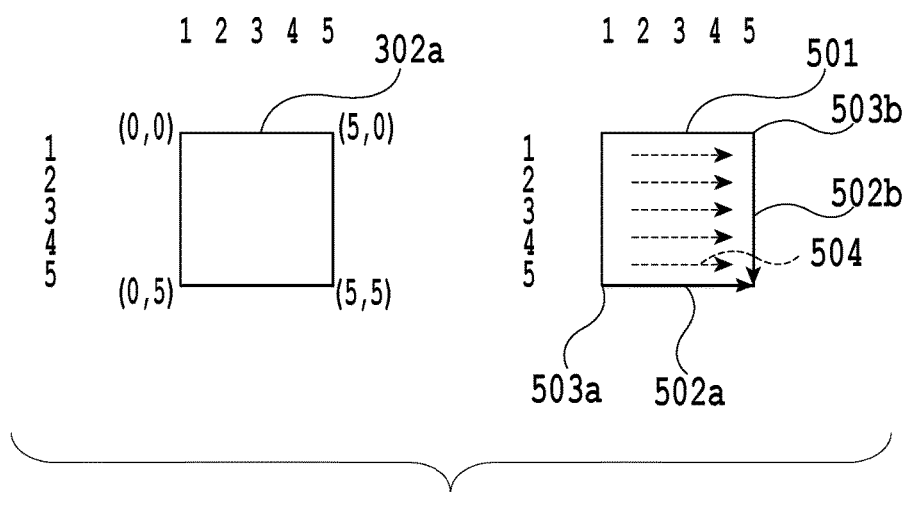
FIG. 5 is a diagram explaining examples of parameters in the embodiment.

On the other hand, in the printing time prediction sequence, the CPU 101 acquires the parameter value indicating the feature of the object without performing the rendering processing that requires many computer resources. Then, the CPU 101 derives a printing prediction time of the PDL data based on the acquired parameter value. FIG. 5 is a diagram explaining examples of the number of pixels, the number of segments, and the number of spans, which are the feature possessed by the object 302a in the present embodiment. In FIG. 5, an example is explained in which the parameter value is acquired from the single object 302a. The object 302a is a square object having a width of 5-pixel length and a height of 5-pixel length. In this example, the following parameter values are acquired by analyzing the object 302a.

Number of pixels: the total value of pixels making up the object and the number of pixels is 5×5=25 as shown in FIG. 5.

Number of segments: the total value of points of change in slope at the edge and the number of segments in this example is "2" as illustrated by a segment 503a and a segment 503b.

Number of spans: the total value of scan lines within the path and the number of spans in this example is "5" as illustrated by a span 504.

As explained above, the path 501 corresponds to the point series indicating the entire outline of the object 302a or the segment that connects the point series and edges 502a and 502b correspond to vector information acquired by tracing the point series of the object 302a.

Returning to FIG. 4 again, the procedure of the printing time prediction sequence in the prior art is explained. For the sake of convenience, the prior art is explained by referring to each function block shown in FIG. 2. In the printing time prediction sequence in the prior art also, the profile generation unit 250 acquires the parameter value by analyzing an object.

However, in the printing time prediction processing in the prior art, optimization of an object in the printing sequence is not taken into consideration, and therefore, it is possible to acquire only the parameter value for each object. That is, even in the case where the objects 302a to 302e whose data amount is small are drawn densely within a predetermined area, the profile generation unit 250 does not take into consideration the case where the objects are combined and acquires the parameter value for each object. In this case, in the profile that is generated, five kinds of parameter values including not only the parameter values corresponding to the object 302a shown below but also those corresponding to the objects 302b to 302e are included as a result.

Number of pixels: 25
Number of segments: 2
Number of spans: 5

In the printing time derivation processing in the prior art, it is necessary to perform calculation, such as multiplication of each of a large number of parameter values by a coefficient (e.g., time necessary to perform rendering processing of the object). As a result of this, in the printing sequence, the rendering processing of the optimized object is performed at a fast rate and the bitmap image data is output, but there is a case where the prediction accuracy of the printing time is degraded, such as that the printing prediction time presented to a user is lengthened.

In contrast to this, in the printing time prediction sequence of the present embodiment, the optimization prediction unit 230 estimates the parameter values, such as the number of segments, the number of spans, and the number of pixels, which are expected to be acquired from an optimized object. In this case, in the profile that is generated, one kind of the following estimated parameter values that take into consideration the case where the objects 302a to 302e are combined is included as a result.

Number of pixels: 89
Number of segments: 18
Number of spans: 13.

Due to the configuration such as this, in the printing time prediction processing of the present embodiment, the optimization of the object in the printing sequence is taken into consideration, and therefore, it is possible to predict the printing time of PDL data with a high accuracy. The optimization prediction processing that is essential to the present embodiment will be explained later in the explanation of the flowchart in FIG. 6 and the subsequent drawings.

Figure 6:
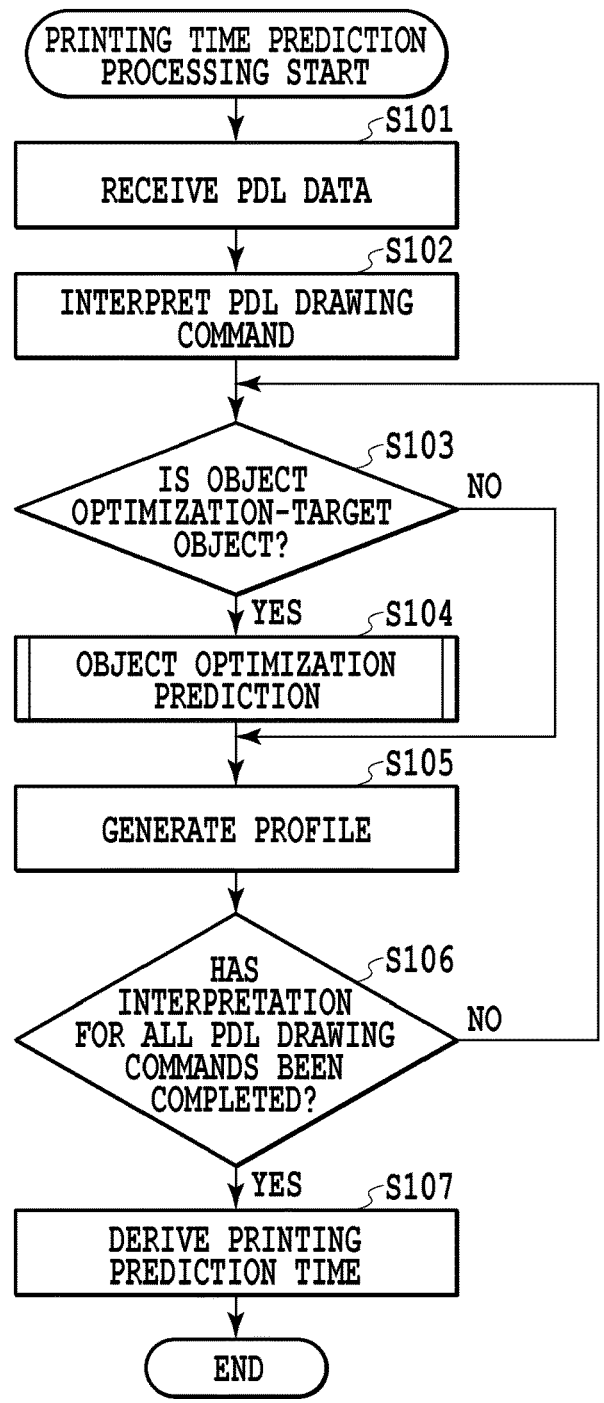
FIG. 6 is a flowchart showing a processing procedure in the embodiment.

FIG. 6 is a flowchart showing a procedure of the printing time prediction processing of the present embodiment. In the following, with reference to FIG. 6, an example of the printing time prediction processing is explained. The processing by the flowchart shown in FIG. 6 is performed by the CPU 101 developing the program code stored in the ROM 103 onto the RAM 102 and executing the program code.

At S101, the printing time prediction apparatus 100 receives PDL data from an external device, such as a PC. At this time, the CPU 101 stores the received PDL data in a predetermined storage area, such as the RAM 102.

At S102, the PDL interpretation unit 210 interprets a PDL drawing command included in the PDL data and generates an object for each PDL drawing command.

At S103, the optimization prediction unit 230 determines whether the object generated at S102 is an optimization-target object. Specifically, the optimization prediction unit 230 determines whether the object generated at S102 is a type of object for which the optimization shown in FIG. 3A to FIG. 3C is performed in the printing sequence. In the case where the object is an optimization-target object (S103: YES), the processing moves to S104. On the other hand, in the case where the object is not an optimization-target object (S103: NO), S104 is skipped.

At S104, the optimization prediction unit 230 predicts a change that is made to the object by the optimization. Then, the optimization prediction unit 230 estimates the parameter values indicating the feature of the object after the change. Details of the processing procedure at S104 will be described later.

At S105, the profile generation unit 250 generates a profile in which the parameter value acquired from the object generated at S102 or the parameter value estimated by the optimization prediction unit 230 is associated with each kind of object. In the field of the image processing, a logical drawing method (ROP: RASTER OPERATION) of determining the drawing contents of an object by a logic operation expression is known. In the logical drawing method such as this, the renderer control unit 260 determines the drawing element of an object based on a combination of operators (logic operation expressions), such as XOR-AND-XOR. It is known that the combination of operators such as this is also simplified by the above-described optimization of an object. It is possible for the profile generation unit 250 of the present embodiment to acquire the number of logic operation expressions or the like that changes accompanying the optimization of an object as the parameter value.

At S106, the CPU 101 determines whether the interpretation of all the PDL drawing commands included in the PDL data received at S101 has been completed. In the case where the interpretation of all the PDL drawing commands has been completed (S106: YES), the processing moves to S107. In the case where the interpretation of all the PDL drawing commands has not been completed yet (S106: NO), the processing at S103 and the subsequent steps is performed again.

At S107, the prediction time derivation unit 270 refers to the profile generated at S105 and derives a printing prediction time of the PDL data based on the parameter values included in the profile. In the present embodiment, the prediction time derivation unit 270 calculates a printing prediction time by calculating the acquired parameter values by a calculation expression defined in advance. As the calculation expression for calculating a printing prediction time, for example, an expression below is used.

$$(\text{Printing time}) = \sum_{i=0}^{M}(p_i \times x_i) + C \qquad \text{Expression (1)}$$

In expression (1), M indicates the total number of objects to be acquired, p indicates a type of parameter, x indicates a coefficient, and C indicates a constant term, respectively. The coefficient x is determined based on the time necessary to actually perform the rendering processing of an object corresponding to the parameter p. For example, in the case where the printing time of the PDL data in which only the drawing command of the object 302a is included in one page is predicted, the profile generation unit 250 acquires the number of edges "2" as the value of the parameter p. Next, by the prediction time derivation unit 270 substituting the number of edges "2" acquired by the profile generation unit 250 in expression 1, the parameter p is multiplied by the coefficient x and a printing prediction time can be obtained.

As described above, in the present embodiment, by the prediction time derivation unit 270 calculating the acquired parameter values by a calculation expression defined in advance, a printing prediction time is calculated. However, the embodiment is not limited to the above and it may also be possible for the prediction time derivation unit 270 to acquire a printing prediction time by referring to a lookup table defined in advance. In this case, for example, it is possible to use a lookup table in which the sum value of the parameter values of each page and a printing prediction time are stored in association with each other. On the completion of the printing prediction time derivation processing (S107), this flowchart is terminated.

Figure 7:
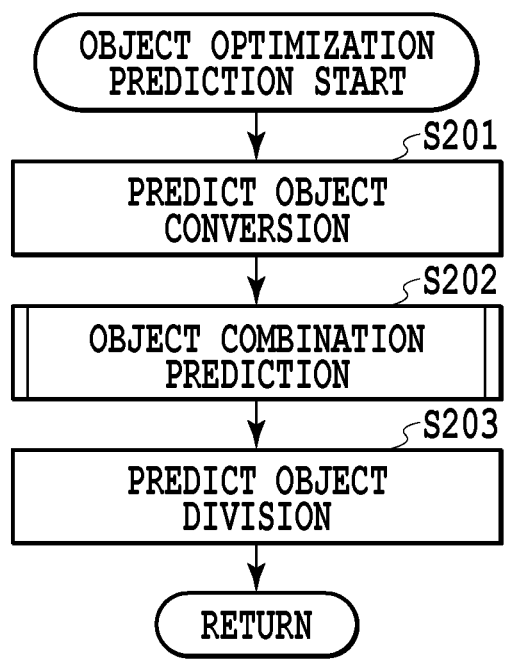
FIG. 7 is a flowchart showing a processing procedure in the embodiment.

FIG. 7 is a flowchart showing a procedure of object optimization prediction processing in the present embodiment. In the following, an example of the object optimization prediction processing is explained with reference to FIG. 7. The processing by the flowchart shown in FIG. 7 is performed by the CPU 101 developing the program code stored in the ROM 103 onto the RAM 102 and executing the program code.

At S201, the conversion prediction unit 231 predicts a change that is made to the object generated by the PDL interpretation unit 210 by the conversion in the case where the object is optimized in the rendering processing. It may also be possible for the conversion prediction unit 231 to actually perform conversion processing for the object generated at S102.

At S202, the combination prediction unit 232 predicts a change that is made to the object generated by the PDL interpretation unit 210 by the combination in the case where the object is optimized in the rendering processing.

At S203, the division prediction unit 233 predicts a change that is made to the object generated by the PDL interpretation unit 210 by the division in the case where the object is optimized in the rendering processing. It may also be possible for the division prediction unit 233 to actually perform conversion processing for the object generated at S102. On the completion of the processing at S203, the processing returns to the flowchart of the printing time prediction processing (FIG. 6).

Figure 8:
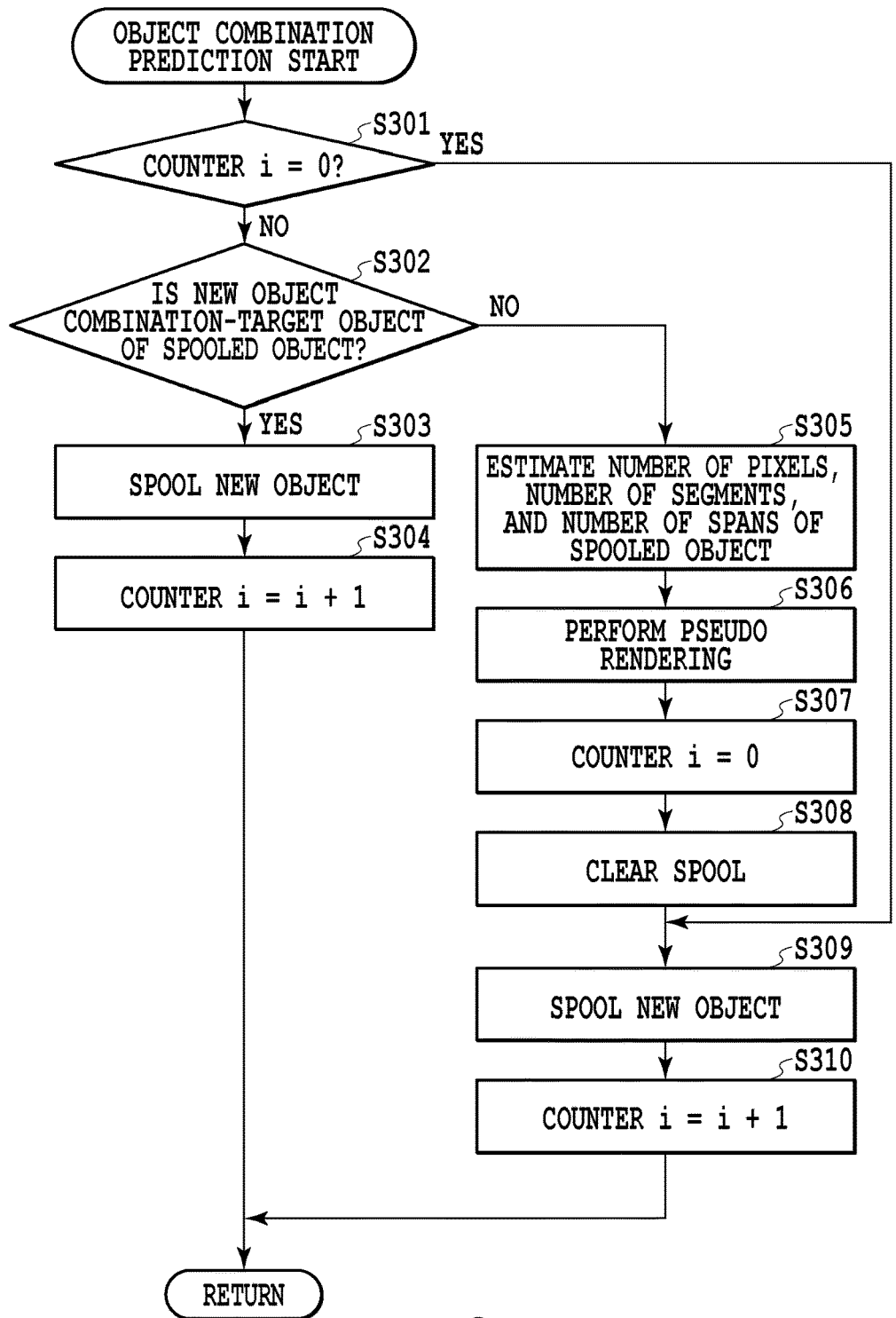
FIG. 8 is a flowchart showing a processing procedure in the embodiment.

FIG. 8 is a flowchart showing a procedure of object combination prediction processing in the present embodiment. In the following, an example of the object combination prediction processing is explained with reference to FIG. 8. The processing by the flowchart shown in FIG. 8 is performed by the CPU 101 developing the program code stored in the ROM 103 onto the RAM 102 and executing the program code.

At S301, the combination prediction unit 232 determines whether the value of a counter i indicating the number of objects spooled in a storage area, such as the RAM 102, is 0. In the case where counter i=0 (S301: YES), the processing moves to S309. In the case where counter i≠0 (S301: NO), the processing moves to S302.

At S302, the combination prediction unit 232 determines whether a new object generated at S102 is a combination-target object of the spooled object. In the present embodiment, in the case where one of the following conditions is satisfied, it is determined that the new object is a combination-target object. The conditions are merely exemplary and it may also be possible to determine that the new object is a combination-target object only in the case where both of the following conditions are satisfied.

(1) The new object has a size (area) less than or equal to a predetermined threshold value
(2) A bounding box corresponding to the object after combination has a size (area) less than or equal to a predetermined threshold value in the case where the new object is combined Here, the bounding box is a value specifying a circumscribed square including one or a plurality of objects and the value specifying the bounding box is described by a combination of the coordinates of the top-left vertex and the coordinates of the bottom-right vertex. For example, in the case where the object 302 (FIG. 4) is combined, the bounding box is indicated by a reference number 312c and the value specifying the bounding box 312c is described as "(0, 0) (13, 13)".

In the case where it is determined that the new object is a combination-target object (S302: YES), the processing moves to S303. On the other hand, in the case where it is determined that the new object is not a combination-target object (S303: NO), the processing moves to S305. At S303, the combination prediction unit 232 spools the new object in a storage area, such as the RAM 102. At S304, the combination prediction unit 232 increments the value of the counter i by "1" and the processing returns to the flowchart of the object optimization processing (FIG. 7).

At S305, the combination prediction unit 232 predicts the number of pixels, the number of segments, and the number of spans acquired from the object after the combination in the case where the plurality of spooled objects is combined. In the following, the estimation of the number of pixels, the number of segments, and the number of spans in the present embodiment is explained by taking the object 302 (FIG. 4) as an example.

The combination prediction unit 232 estimates the number of pixels acquired from the object after the combination by removing the number of pixels in the overlap area from the total number of pixels of the plurality of spooled objects. In the example of the object 302, the total number of pixels of the objects 302a to 302e is "125" and by subtracting the number of pixels "36" in the overlap area from "125", "89" that is the estimated number of pixels is obtained. In the case where the shape of the object after the combination is a common polygon, such as a hexagon, it may also be possible to acquire the number of pixels by using a formula for finding an area of a polygon.

The combination prediction unit 232 estimates the number of segments acquired from the object after the combination based on the overlap state of the plurality of spooled objects. In the case where part of the square objects overlap as the objects 302a and 302b, the number of segments of the object after the combination increases by "2". In the example of the object 302, the total number of segments of the objects 302a to 302e is "10" and by adding "8" by which the number of segments increases due to the overlap to "10", "18" that is the estimated number of segments is obtained. In the case where a certain object is included in another object, the number of segments acquired from the object after the combination does not increase.

The combination prediction unit 232 estimates the number of spans acquired from the object after the combination based on the overlap state of the plurality of spooled objects. In the case where part of the square objects overlap as the objects 302a and 302b, the number of spans of the object after the combination decreases by an amount corresponding to the height of the overlap. In the example of the object 302, the total number of spans of the objects 302a to 302e is "25" and by subtracting "12" by which the number of spans decreases due to the overlap from "25", "13" that is the estimated number of spans is obtained. In the present embodiment, the estimated number of spans coincides with the height of the bounding box of the object after the combination.

As above, the example of the processing to estimate the number of pixels, the number of segments, and the number of spans acquired from the object after the combination is explained by taking the object 302 as an example, but the embodiment is not limited to the above. For example, the processing-target object may not be a square object like the object 302. For example, for an object in the shape other than a square, it is possible for the combination prediction unit 232 to estimate the number of pixels, the number of segments, and the number of spans with a high accuracy by calculating the number of pixels, the number of segments, and the number of spans per unit area and adding these numbers. Further, for example, even in the case where there occurs no overlap between the plurality of objects, it is possible for the combination prediction unit 232 to estimate the number of pixels, the number of segments, and the number of spans acquired from the object after the combination.

Figure 9:
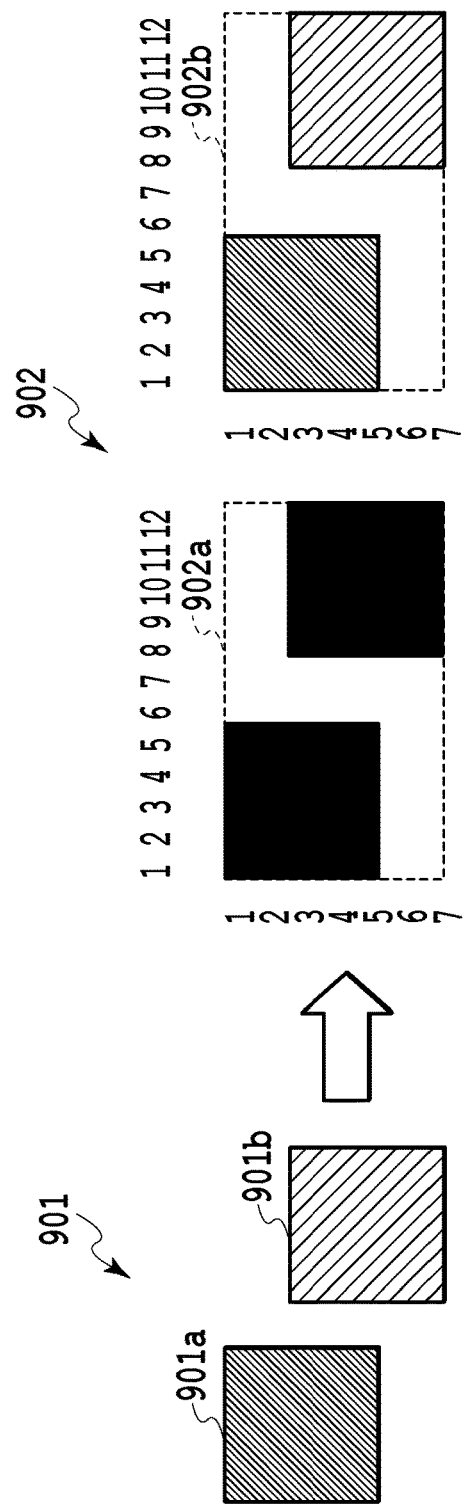
FIG. 9 is a conceptual diagram of object combination in the embodiment.

FIG. 9 is a conceptual diagram showing the case where square objects 901*a* and 901*b* each having a width of five-pixel length and a height of five-pixel length are combined into an image object 901 having a mask 902*a* and an image 902*b*. As shown in FIG. 9, there occurs no overlap between the objects 901*a* and 901*b*. First, the combination prediction unit 232 finds a path of the image object 902 from the size of a bounding box (0, 0) (12, 7) of an object 901. Here, the path of the image object 902 has a size equal to the size of the outline of the mask 902*a*. Further, in the example of the object 901, the path of the image object 902 after the combination corresponds to the size of the bounding box, and therefore, the estimated number of pixels "84" is obtained. Furthermore, the path of the image object 902 after the combination is a square similar to the bounding box, and therefore, the estimated number of segments "2" is obtained. Still furthermore, from the height of the path of the image object 902 after the combination, the estimated number of spans "7" is obtained. As explained above, the combination prediction unit 232 estimates the number of pixels, the number of segments, and the number of spans acquired from the object after the combination of the object 901 as follows.

Number of pixels: 84
Number of segments: 2
Number of spans: 7

Figure 10:
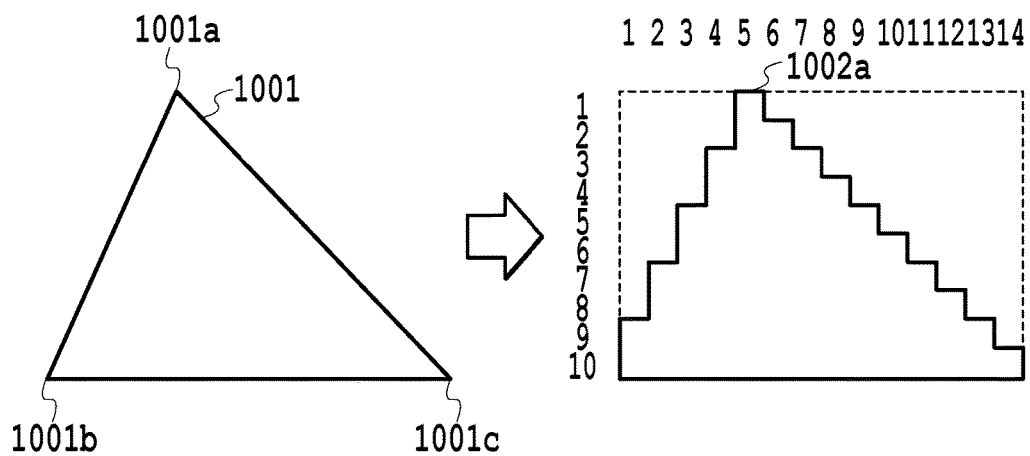
FIG. 10A and FIG. 10B are each a conceptual diagram of object combination in the embodiment.
Figure 10:
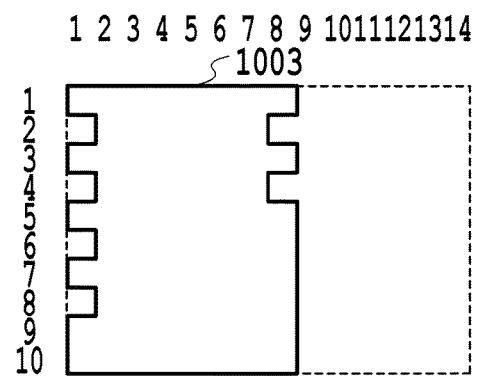

FIG. 10A is a conceptual diagram showing the case where a triangular object 1001 having a base of a 14-pixel length and a height of 10-pixel length is combined (converted) into an object having a path 1002*a*. An example is explained in which the area of the triangular object 1001 corresponds to 70 pixels and as the results of being combined (converted) into the object having the path 1002*a*, the number of pixels becomes 75 because of occurrence of the shape of a step in the path. In the present embodiment, in the case where an object having a slope is combined, the path of the object after the combination includes the shape of a step. In this case, it is possible to estimate the number of segments acquired from the object after the combination by using an expression below.

$$\text{number of segments} = \text{MIN}(\text{ABS}(x1-x2), \text{ABS}(y1-y2)) \times 2 \quad \text{Expression (2)}$$

Here, (x1, y1) and (x2, y2) each indicate vertex coordinates in the triangular object 1001 and in this example, vertex coordinates 1001*a* are (x1, y1) and vertex coordinates 1001*b* are (x2, y2). Similarly, a relationship in which the vertex coordinates 1001*a* are (x1, y1) and vertex coordinates 1001*c* are (x2, y2) may also hold. MIN represents a function to return the minimum value within arguments and ABS represents a function to return the absolute value of the argument, respectively. From the above, the combination prediction unit 232 estimates the number of pixels, the number of segments, and the number of spans acquired from the object after the combination of the object 1001 as follows.

Number of pixels: 75

Number of segments: 28
Number of spans: 10

A list of the estimated values of the number of pixels, the number of segments, and the number of spans acquired from the object after the combination explained in the above-described embodiment is shown in FIG. 15.

At S306, the combination prediction unit 232 generates a pseudo object having the feature specified by the number of pixels, the number of segments, and the number of spans estimated at S305. Here, the pseudo object is an image of a drawing object having the same feature as or an approximate feature of the feature of the object after the change and the pseudo object is generated without performing the actual rendering processing. Further, it is possible for the profile generation unit 250 to acquire parameter values by analyzing the pseudo object like a common object.

In the printing time prediction apparatus 100 of the present embodiment, the profile generation unit 250 has a great affinity for drawing object format data. The reason is that the profile generation unit 250 performs the same kind of control as that of the intermediate data generation unit 240, such as control to operate the number of pixels, the number of segments, the number of spans, etc., by analyzing a drawing object in the printing sequence. Because of this, by the optimization prediction unit 230 generating a pseudo object once, it is possible for the profile generation unit 250 to efficiently generate a profile including parameter values.

Figure 11A:
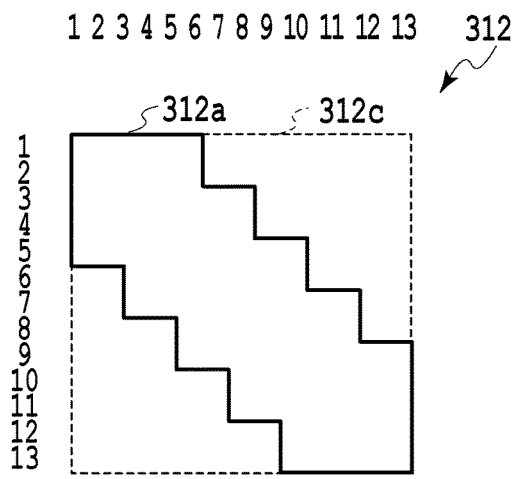
FIG. 11A to FIG. 11D are each a conceptual diagram showing a pseudo object in the embodiment.
Figure 11B:
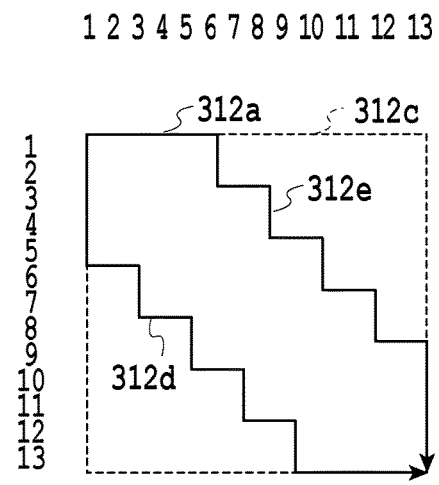

In the following, by taking the object 302 (FIG. 4) as an example, an object after combination in the printing sequence and a pseudo object in the printing time prediction sequence are explained by comparing both the objects. FIG. 11A shows the object 312 (path 312*a*) after the combination in the printing sequence. The object 312 (path 312*a*) is the same as that shown in FIG. 3B and the reference number 312*c* indicates the bounding box of the object 312. FIG. 11B is a diagram explaining the number of pixels, the number of segments, and the number of spans, which are the feature possessed by the object 312. As explained in FIG. 5, the path 312*a* corresponds to the point series indicating the entire outline of the object 312 or the segment that connects the point series and edges 312*d* and 312*e* correspond to vector information acquired by tracing the point series of the object 312. In this example, by analyzing the object 312, the following parameter values are acquired.

Number of pixels: 89
Number of segments: 18
Number of spans: 13

Figure 11C:
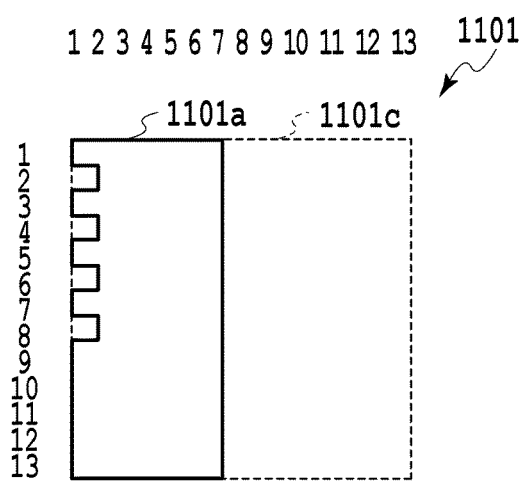
Figure 11D:
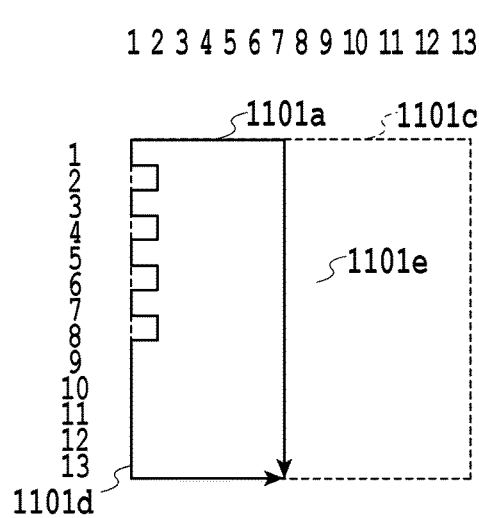

On the other hand, FIG. 11C shows a pseudo object 1101 that is generated based on the estimated parameter values in the printing time prediction sequence. Further, a reference number 1101*c* indicates a bounding box of the pseudo object 1101. FIG. 11D is a diagram explaining an example of the number of pixels, the number of segments, and the number of spans, which are the feature possessed by the pseudo object 1101. A path 1101*a* corresponds to a point series indicating the entire outline of the pseudo object 1101 or a segment that connects the point series and edges 1101*d* and 1101*e* correspond to vector information acquired by tracing the point series of the pseudo object 1101. In this example, by analyzing the pseudo object 1101, the following parameter values are acquired.

Number of pixels: 87
Number of segments: 18
Number of spans: 13.

In the following, a procedure in which the combination prediction unit 232 generates the pseudo object 1101 is explained. First, the combination prediction unit 232 generates a square path (not shown schematically) approximate to the estimated number of pixels in a range that does not exceed the bounding box 312c of the object 312. The height of the square path at this time is set to the same height of the bounding box 312c. The bounding box 312c has a width of 13-pixel length and a height of 13-pixel length. The number of pixels estimated at S305 is "89", and therefore, the combination prediction unit 232 generates a square path having a width of 7-pixel length and a height of 13-pixel length (number of pixels is 7×13=91).

Figure 12:
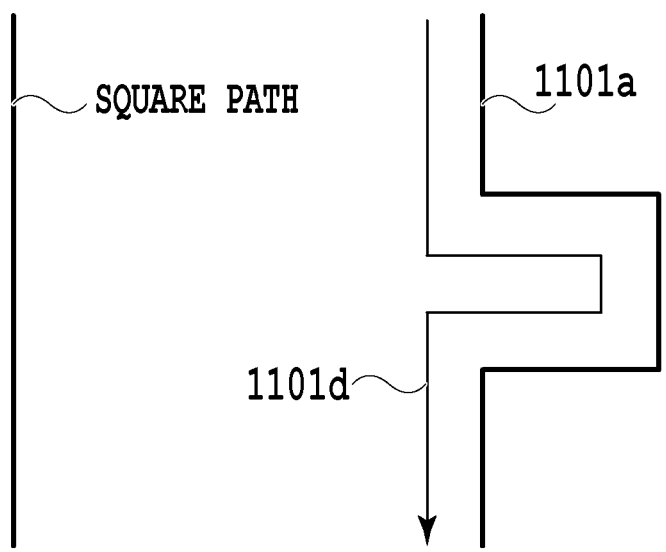
FIG. 12 is a partially enlarged view of the pseudo object in the embodiment.

Next, the combination prediction unit 232 changes the shape of the square path so as to be approximate to the estimated number of segments. An example in which the combination prediction unit 232 changes the shape of the square path is shown in the schematic diagram in FIG. 12. The left diagram in FIG. 12 is a partially enlarged view of the square path before the shape is changed and the right diagram in FIG. 12 is a partially enlarged view of the path 1101a after the shape is changed. As shown in FIG. 12, in accordance with the change in shape of the outline of the square path into a wave shape, the number of segments, which are the points of change at the edge 1101d, also increases by four. The combination prediction unit 232 of the present embodiment changes the shape of the square path into the path 1101 shown in FIG. 11C. In this example, the estimated number of segments is "18", and therefore, the combination prediction unit 232 changes the shape of the square path four times by the method explained in FIG. 12. As a result of this, it is possible for the combination prediction unit 232 to obtain the pseudo object 1101 whose number of segments is "18".

It is possible for the combination prediction unit 232 to change the shape of the square path 1101a so as to be approximate to the estimated number of spans in accordance with the necessity, but in the example in FIG. 11A to FIG. 11B, the path 1101a having a height of the same value of the estimated number of spans "13" is generated, and therefore, in this example, this processing is not performed.

As described above, the combination prediction unit 232 generates a pseudo object having a feature specified by the parameter values estimated at S305. Due to the configuration such as this, it is possible for the printing time prediction apparatus 100 of the present embodiment to provide the number of pixels, the number of segments, and the number of spans, which are a feature of a combination-target object, to the profile generation unit 250 without performing rendering processing actually.

In the shape change processing in FIG. 11A to FIG. 11D, it is possible for the combination prediction unit 232 to approximate the estimated number of segments by changing the shape of only the left side of the square path. In the case where the estimated number of segments is not reached even by changing the shape of only the left side of the square path, it may also be possible for the combination prediction unit 232 to change the shape of the right side of the square path. FIG. 10B is a diagram showing a pseudo object 1003 generated by the combination prediction unit 232 in accordance with the number of pixels, the number of segments, and the number of spans estimated for the triangular object 1001. By the method explained in FIG. 12, the combination prediction unit 232 changes the shape of the pseudo object 1003 so that the number of segments becomes approximate to "28". In this example, the number of segments "16" is obtained by changing the shape of the left side of the pseudo object 1003 (square path) four times, but this value does not reach the estimated number of segments "28". Consequently, the combination prediction unit 232 obtains the number of segments "8" by further changing the shape of the right side of the pseudo object 1003 twice.

Figure 13:
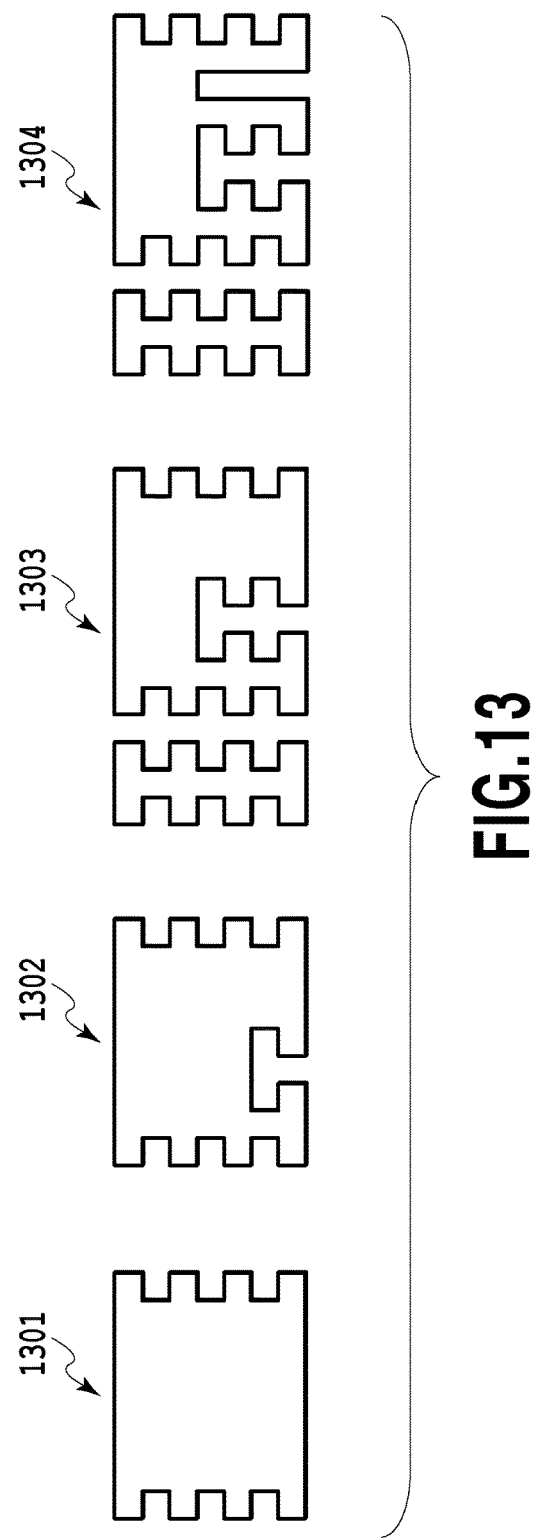
FIG. 13 is a conceptual diagram showing pseudo objects in the embodiment.

Further, in the case where the estimated number of segments is not reached even by changing the shape of both sides of the square path, it may also be possible for the combination prediction unit 232 to obtain a pseudo object 1302 (FIG. 13) by further changing the shape of the inside of the square path. Alternatively, in the case where the number of spans acquired from the pseudo object does not reach the estimated number of spans, it may also be possible for the combination prediction unit 232 to obtain a pseudo object 1303 by further changing the shape of the inside of the square path.

There is a case where the number of pixels of the pseudo object decreases by the combination prediction unit 232 changing the shape of the pseudo object (path). In this case, it is possible for the combination prediction unit 232 to obtain a pseudo object 1304 having a number of pixels approximate to the estimated number of pixels by extending the width of the square path. However, the larger the pseudo object becomes than the bounding box, the more the prediction accuracy of the printing time is reduced, and therefore, it is desirable for the maximum width of the pseudo object to be included within the bounding box. Regarding this point, in order to predict the printing time with a high accuracy, it is desirable to change the shape of the pseudo object (path) so as to be approximate to the feature of the object after the shape is changed in the priority order of the size of the bounding box, the number of pixels, the number of segments, and the number of spans.

Returning to FIG. 8 again, at S307, the combination prediction unit 232 resets the value of the counter i to "0".

At S308, the combination prediction unit 232 deletes the spooled objects and clears the spool area of the RAM 102.

At S309, the combination prediction unit 232 spools the new object in a storage area, such as the RAM 102.

At S310, the combination prediction unit 232 increments the value of the counter i by "1" and returns to the flowchart of the object optimization processing (FIG. 7).

FIG. 14 is a screen display example that is displayed on the operation unit 106, including a touch screen display. The printing time prediction apparatus 100 of the present embodiment is an image forming apparatus having a so-called spool printing function. In general, the spool printing refers to a function of an image forming apparatus which temporarily spools a received print job and produces an output onto a printing medium in accordance with an operation, such as an operation to input a user ID. It is possible for the image forming apparatus of the present embodiment to display a printing predicted time 1401 derived in the printing time prediction sequence on the operation unit 106 in association with the spooled print job. Due to the configuration such as this, it is possible for a user to determine the order of the print jobs that are output by the image forming apparatus based on the printing prediction time with a high accuracy. In this manner, it is possible for the printing time prediction apparatus 100 of the present embodiment to provide a user with a printing environment with a higher convenience.

As explained above, it is possible for the printing time prediction apparatus of the present embodiment to derive a printing prediction time by taking into consideration optimization of an object in the printing sequence. Due to the configuration such as this, it is possible for the printing time prediction apparatus to predict a printing time necessary to perform printing of print data with a high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It is possible for the printing time prediction apparatus of the present invention to predict a printing time of print data with a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-018201, filed Feb. 2, 2016, which is hereby incorporated by reference wherein in its entirety.

What is claimed is:

1. A printing apparatus which performs a predetermined conversion process to convert at least one object contained in a page into one or more new objects and performs a rendering process based on at least the generated new objects, comprising:
   a memory storing a program; and
   at least one processor configured to execute the program and function as:
     an interpretation unit configured to interpret print data of the page to obtain objects contained in the page;
     an optimization prediction unit configured to identify parameters regarding the at least one object to be subject to the predetermined conversion process, and to predict, in accordance with the identified parameters of the at least one object, characteristic of the new objects which are to be obtained by the predetermined conversion process, wherein the prediction is performed without performing the predetermined conversion process; and
     an estimation unit configured to estimate a time required for the rendering process of the page, based on at least parameter values corresponding to the predicted characteristics, wherein one of the parameter values is a predicted value related to a number of pixels making up the path which is predicted to define an outline of the new object which is to be obtained by the predetermined conversion process.

2. The printing apparatus according to claim 1, wherein the predetermined conversion process is object combination in which a plurality of the objects is combined into a single object.

3. The printing apparatus according to claim 1, wherein the predetermined conversion process is object division in which the object is divided into a plurality of objects.

4. The printing apparatus according to claim 1, wherein the estimation unit further comprises:
   a profile generation unit configured to acquire parameter value and to generate a profile in which the acquired parameter value is associated with each type of the object.

5. The printing apparatus according to claim 1, wherein the estimation unit estimates the time by calculation using at least the parameter values.

6. The printing apparatus according to claim 1, wherein, in a case where an outline of an object is defined as a path and vector information acquired by tracing an outline of an object is defined as an edge,
   the parameter value is at least one of a number of pixels, which is a total value of pixels making up the path, a number of segments, which is a total value of points of change in slope at the edge, and a number of spans, which is a total value of scan lines within the path in the object after the change.

7. The printing apparatus according to claim 1, wherein:
   the optimization prediction unit generates pseudo objects having the predicted characteristics to simulate characteristics of the new objects, the pseudo objects being different from the new objects; and
   the estimation unit obtains the pseudo objects and acquires the parameter values by analyzing the obtained objects.

8. The printing apparatus according to claim 7, wherein the optimization prediction unit generates the pseudo objects so as to be approximate to characteristics of the new objects in a priority order of a size of a bounding box that specifies a circumscribed square including the object, the number of pixels, the number of segments, and the number of spans.

9. The printing apparatus according to claim 7, wherein the optimization prediction unit generates the pseudo objects without performing the predetermined conversion process.

10. The printing apparatus according to claim 1, further comprising:
    a display control unit configured to display time information using the estimated time on a display unit in association with the print data.

11. The printing apparatus according to claim 1, further comprising:
    a network interface capable of receiving the print data;
    a user interface capable of accepting an instruction to print the received print data from a user;
    a first generation unit, which is implemented by the at least one processor, configured to interpret the received print data and to generate a plurality of objects in an intermediate data format, the plurality of objects containing the one or more new objects obtained by performing the predetermined conversion process in accordance with the acceptance of the print instruction;

a renderer configured to generate a bitmap image of the page by performing the rendering process based on the generated plurality of objects in the intermediate data format; and a printer unit configured to print the generated bitmap image, wherein the optimization prediction unit, and the estimation unit can operate after the reception of the print data and before the acceptance of the print instruction.

12. A method executing by a printing apparatus for estimating a time required for a rendering process of the page performed by an apparatus which performs a predetermined conversion process to convert at least one object contained in the page into one or more objects and performs the rendering process based on at least generated new objects, the method, executed by a processor of the printing apparatus, comprising:

interpreting print data of the page to obtain objects contained in the page;

identifying parameters regarding the at least one object to be subject to the predetermined conversion process;

predicting, in accordance with the identified parameters of the at least one object, characteristic of the new objects which are to be obtained by the predetermined conversion process, wherein the prediction is performed without performing the predetermined conversion process; and estimating a time required for the rendering process of the page, based on at least parameter values corresponding to the predicted characteristics, wherein one of the parameter values is a predicted value related to a number of pixels making up the path which is predicted to define an outline of the new object which is to be obtained by the predetermined conversion process.

13. A non-transitory computer readable storage medium storing a program for causing a computer to estimate a time required for a rendering process of at least one or more objects into which a predetermined conversion process converts at least one object contained in a page, the program comprising code for executing:

interpreting print data of the page to obtain objects contained in the page;

identifying parameters regarding the at least one object to be subject the predetermined conversion process;

predicting, in accordance with the identified parameters of the at least one object, characteristic of the new objects which are to be obtained by the predetermined conversion process, wherein the prediction is performed without performing the predetermined conversion process; and estimating a time required for the rendering process of the page, based on at least parameter values corresponding to the predicted characteristics, wherein one of the parameter values is a predicted value related to a number of pixels making up the path which is predicted to define an outline of the new object which is to be obtained by the predetermined conversion process.

14. A printing apparatus which performs a predetermined conversion process to convert at least one object contained in a page into one or more new objects and performs a rendering process based on at least the generated new objects, comprising:

a memory storing a program; and at least one processor configured to execute the program and function as:

an interpretation unit configured to interpret print data of the page to obtain objects contained in the page;

an optimization prediction unit configured to identify parameters regarding the at least one object to be subject to the predetermined conversion process, and to predict, in accordance with the identified parameters of the at least one object to be subject to the predetermined conversion process, characteristic of the new objects which are to be obtained by the predetermined conversion process, wherein the prediction is performed without performing the predetermined conversion process in the prediction; and an estimation unit configured to estimate a time required for the rendering process of the page, based on at least parameter values corresponding to the predicted characteristics, wherein one of the parameter values is a predicted value related to a number of points of changes in slopes at the edges of the outline which is predicted to define the new object which is to be obtained by the predetermined conversion process.

15. A printing apparatus which performs a predetermined conversion process to convert at least one object contained in a page into one or more new objects and performs a rendering process based on at least the generated new objects, comprising:

a memory storing a program; and at least one processor configured to execute the program and function as:

an interpretation unit configured to interpret print data of the page to obtain objects contained in the page;

an optimization prediction unit configured to identify parameters regarding the at least one object to be subject to the predetermined conversion process, and to predict, in accordance with the identified parameters of the at least one object, characteristics of the new objects which are to be obtained by the predetermined conversion process without performing the predetermined conversion process in the prediction; and an estimation unit configured to estimate a time required for the rendering process of the page, based on at least parameter values corresponding to the predicted characteristics, wherein one of the parameter values is a predicted value related to a number of scan lines within the path which is predicted to define the new objects which is to be obtained by the predetermined conversion process.

* * * * *